Sept. 9, 1969    J. A. BOUTILIER    3,466,595

ELECTRICAL CONNECTOR FOR TEST GEAR

Filed Sept. 25, 1967    3 Sheets-Sheet 2

INVENTOR.
JAMES A. BOUTILIER

BY Lawrence H. Poston

AGENT

Sept. 9, 1969  J. A. BOUTILIER  3,466,595
ELECTRICAL CONNECTOR FOR TEST GEAR
Filed Sept. 25, 1967  3 Sheets-Sheet 3

INVENTOR.
JAMES A. BOUTILIER

BY

AGENT

United States Patent Office 3,466,595
Patented Sept. 9, 1969

3,466,595
ELECTRICAL CONNECTOR FOR TEST GEAR
James A. Boutilier, Taunton, Mass., assignor to The Foxboro Company, Foxboro, Mass., a corporation of Massachusetts
Filed Sept. 25, 1967, Ser. No. 670,280
Int. Cl. H01r 13/10, 15/26
U.S. Cl. 339—253                           1 Claim

ABSTRACT OF THE DISCLOSURE

An electrical test connector wherein a wire end is held in a recess by compressed ball contact spring pressure applied to the side of the wire end in the recess, providing easily detachable essentially force fit assembly.

---

This invention relates to electrical connectors, and has particular reference to quick connect and disconnect devices.

This invention provides a connector of this nature, particularly for use in test gear. For such usage, this invention provides assembly of a test probe or wire end to a connector jack by simple, direct push, and disassembly by simple direct pull.

Prior art devices are commonly provided with some sort of latching means wherein a slot or hole in one connector part is engaged by some sort of detent on the other connector part.

This invention requires no such special forms nor does it have the potential misalignment and poor connector problems of such prior art structure.

This invention provides a quick connector which achieves the advantages of a solid, permanent force fit, while operating on a small force, spring pressure basis so that simple and easy connection and disconnection is made possible.

In this invention, a simple recess is provided in one connector part, and a simple probe or wire end is easily inserted in this recess.

A transversely applied, spring pressed ball contact is mounted in the receptor connector part. Entry of the connector probe into the receptor recess pushes the ball contact sideways in the receptor, against the pressure of a spring. Thereafter, this connector part and the test probe are together cammed deeper into an outer housing.

In full assembly, the spring is so compressed as to become essentially solid and non-resilient. Thus, the connector probe is essentially in a force fit situation in said receptor recess, against a laterally applied effectively solid receptor device, in the form of a ball contact backed up by a spring, ordinarily a coil spring.

Accordingly, one form of this invention provides a female connector jack, with a transversely mounted spring pressed ball contact, for receiving a test probe or the bare end of a test wire, in a grip that is essentially a force fit, and yet readily disconnectable by a simple pull on the test probe or wire.

The ball contact acts as a cam in the introduction of the test probe and as a rolling release element in the disconnect action.

This device may be set up in multiples, in a group arrangement particularly suited for group testing the electrical continuity and resistance of cable wires.

Other objects and advantages of this invention will be in part apparent and in part pointed out hereinafter and in the accompanying drawings, in which.

Figure 1:
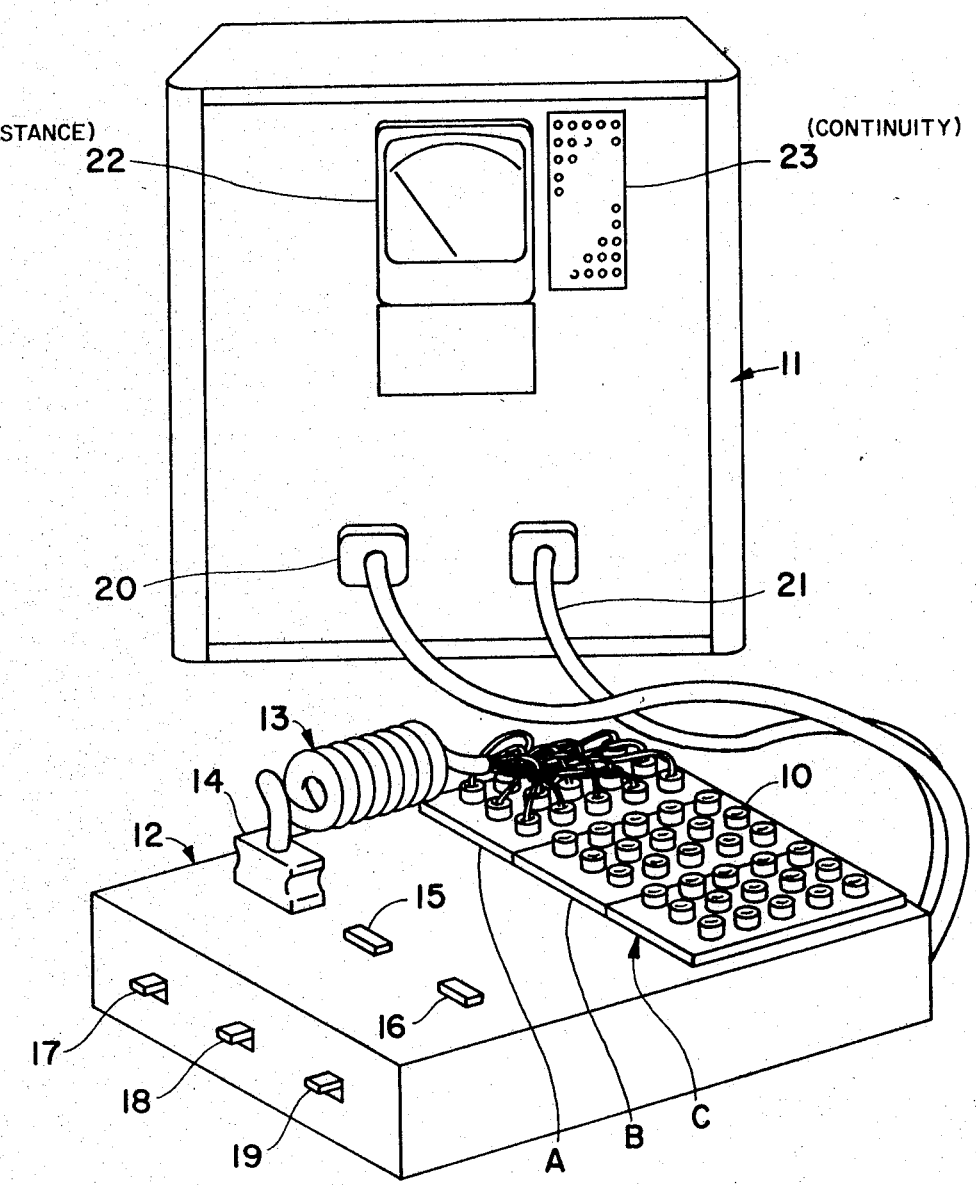
FIGURE 1 illustrates an electrical test panel set-up for simultaneous test of all the wires in a cable, in which many of the connector units, each according to this invention are used.

In FIGURE 1, a test system for electrical continuity and resistance, and using many connectors 10 embodying this invention, comprises an indicator unit 11 and a connector and switching unit 12. This is a cable test system, with one cable shown under test at 13 plugged in to the unit 12 at 14, with the individual wires of the cable 13 connected separately and individually to their respective connector devices 10 in test bank a. There are three test banks a, b, and c in this system, each handling up to 15 wires at the same time. For convenience these test banks are indicated at the points of connection a, b, c, where the connector devices of this invention are used.

The cable for test bank b would be plugged into the unit 12 at 15, and for bank c, at 16. The test for each bank is activated, when desired, by switches 17, 18, and 19, individual respectively to test banks a, b, and c. One bank at a time is put on test by the switches 17, 18 and 19, and main connector cables 20 and 21, are switched to each bank as needed. Cable 20 is in the resistance measurement circuit, leading to a meter 22. Cable 21 is in the continuity measurement circuit, leading to a bank of continuity indicator lights, at 23.

Figure 2:
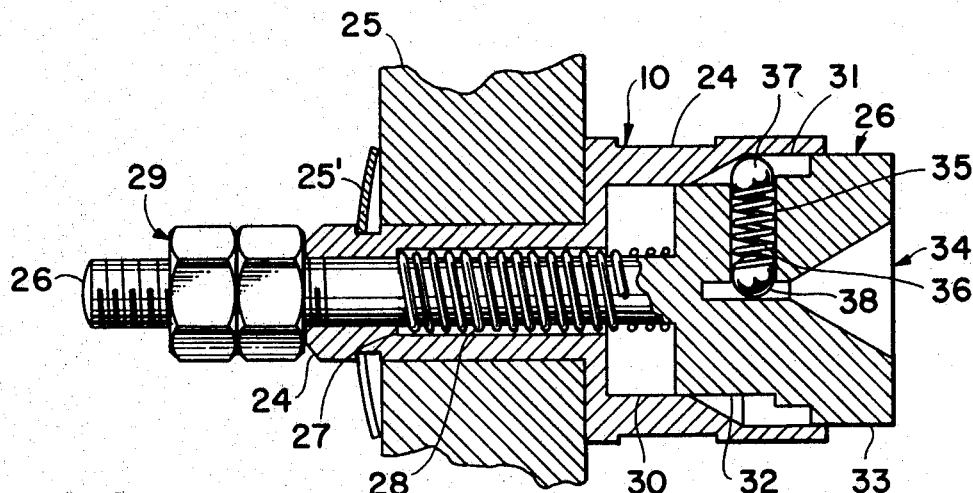
FIGURE 2 is a central, axial section through a receptor assembly in disconnected condition, according to this invention.

In FIGURE 2, the connector unit 10 comprises an outer housing 24 in the form of a hollow stemmed cup. The stem of the housing extends through a mounting plate 25. The bottom of the cup form is held against the plate 25 by a c spring 40 in an outer peripheral slot 27 in the housing 24, and against the opposite side of the mounting plate 25.

Within the stemmed cup 24 there is a stemmed piston-like member 26, with the piston stem extending through the housing stem, and the piston body contained in the cup body for movement axially in and out of the cup.

Figure 4:
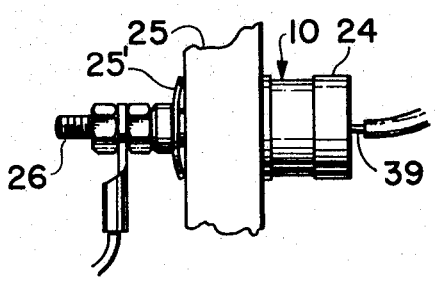
FIGURE 4 is a view of the whole structure of FIGURES 2 and 3, in connected condition, and mounted in a support.
Figure 5:
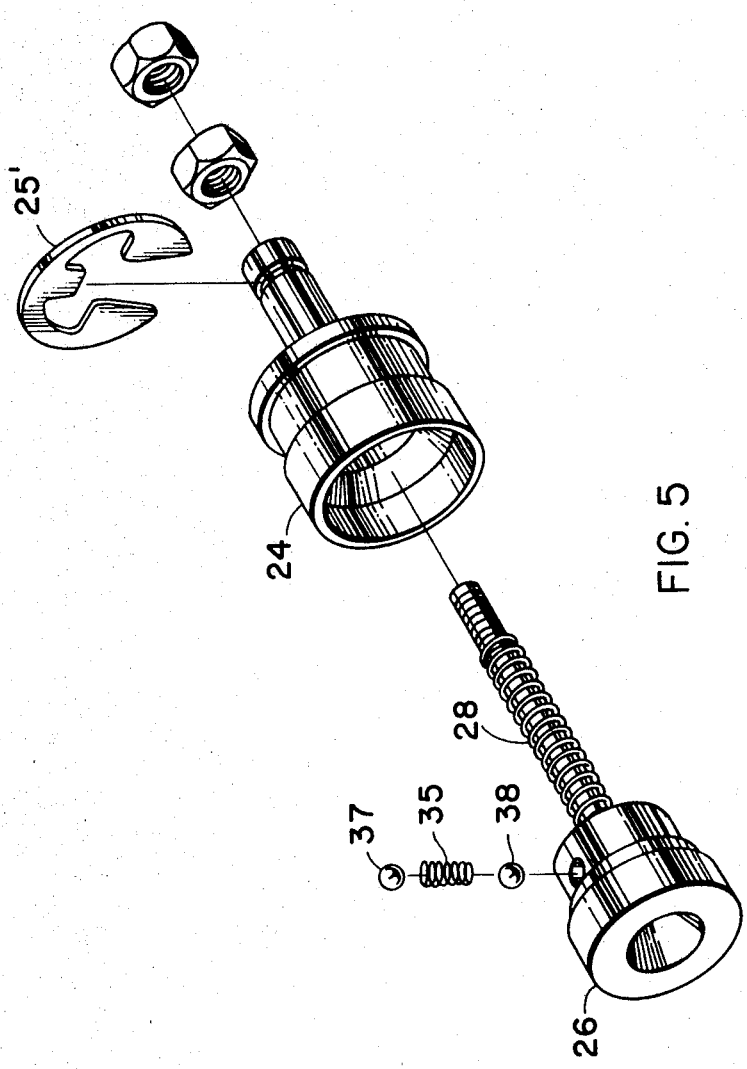
FIGURE 5 is an exploded, whole structure view of the structure of FIGURE 2.

By means of a shoulder 27 inside the cup stem, a coil spring 28 around the piston stem is used to bias the piston body away from the bottom of the cup form. Lock nut and screw threaded means 29 on the piston stem, with the nuts against the outer end of the cup stem, is used to limit the outward travel of the piston 26 as biased by the coil spring 28. As in FIGURE 4, a connecting wire may be secured between the nuts in the arrangement at 29. In a preferred form, the piston 26, in the disconnect situation, extends outwardly beyond the cup 24. Thus the piston may be pushed into the cup against the pressure of the coil spring 28.

The inner wall of the cup 24 is provided with a lesser diameter bottom area 30, and a greater diameter top area 31. These inner surfaces are joined by a tapered surface to provide for a cam function.

The piston 26 is provided with a body portion of lesser diameter at 32 in sliding fit within the cup area 30, and a body portion of greater diameter at 33, in sliding fit withint the cup area 31. These piston diameters are joined by step forms in the outer wall of the piston body. Thus movement of the piston body may be limited either by seating the piston body on the bottom of the cup, or by engaging the inner cam surface of the cup with the step forms of the piston body. This seating is shown in FIGURE 3.

Figure 3:
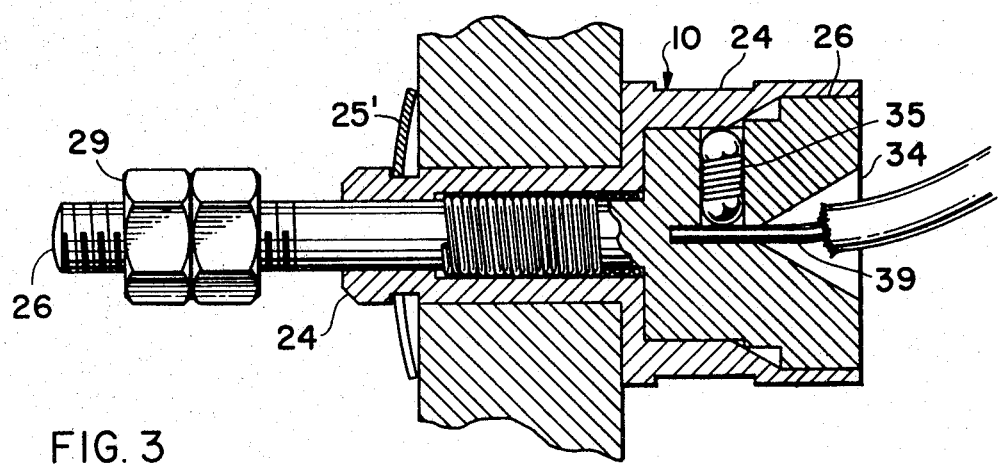
FIGURE 3 is a view of the FIGURE 2 structure, in connected condition with respect to a wire end.

As seen in FIGURES 2 and 3, the piston body 26 has a wire-end receiving recess 34 in its outer end face. The recess is funnel shaped with the large end outward so that a wire end may easily be entered, FIGURE 3, into the small portion of the funnel.

In the piston body 26, a transverse opening 35 is provided between the small portion of the funnel 34 and the exterior of the piston, in the small diameter area 32 thereof. A coil spring 36, with end contact ball members 37 and 38 is mounted in the passage 35.

In the FIGURE 1 showing the spring 35 is fully extended, with the ball 37 engaging the larger inner diameter cup surface 31, and with the ball 38 in the small portion of the funnel 34.

In the first step of assembly, a wire end is pushed lightly into the funnel 34, and seats itself in the small neck portion of the funnel by displacing ball 38 and partially compressing the spring 35. The second step of assembly is to push the piston 26 inward of the cup 24, causing the ball 37 to be cammed into further compression of the spring 35, and briging the ball 37 into engagement with the wall of the smaller inner cup diameter 30.

FIGURE 3 shows this final assembly situation. The wire end 39 is firmly held by the spring device. In the illustration, the spring has been compressed to the point of mutual engagement of its coils, so that the wire end 39 is essentially locked in a force fit situation. This makes for good electrical contact and mechanical holding, yet it is easily releasable by pulling the wire end 39 out. The ball contacts provide rollable engagement which aids in easy release.

Accordingly this invention provides means for locating a test wire end by a gentle push, locking it by a follow-through stronger push, and releasing it by a moderate pull. Thus many leads may be quickly tested, and multiple leads as in a cable may be quickly and easily connected and disconnected so as to make group testing easy.

As many embodiments may be made of the above invention, and as changes may be made in the embodiment set forth above without departing from the scope of the invention, it is to be understood that all matter hereinbefore set forth and in the accompanying drawings is to be interpreted as illustrative only and not in a limiting sense.

I claim:
1. A quick electrical connect-disconnect assembly comprising a wire end receptor, a housing containing said receptor for piston-like relative movement between said housing and said receptor,
  a spring means mounted transversely in said receptor for side engagement with a wire end in said receptor and for engagement with the inner wall of said housing in opposition to said side engagement,
  said housing having two different cross-section sized inner portions connected by an inner wall tapered portion,
  whereby movement of said receptor, while containing said wire end, into the lesser of said housing portions, results in such compression of said spring means between said wire end and the inner wall of said housing as to provide an electrical and mechanical connection of the nature of a readily releasable force fit,
  said receptor being spring biased in the direction from said lesser to said greater inner portions of said housing.

References Cited
UNITED STATES PATENTS

| | | | |
|---|---|---|---|
| 1,348,394 | 8/1920 | Douglas | 339—254 |
| 1,683,066 | 9/1928 | Cohen. | |

FOREIGN PATENTS

| | | |
|---|---|---|
| 1,288,813 | 2/1962 | France. |
| 224,996 | 11/1924 | Great Britain. |

MARVIN A. CHAMPION, Primary Examiner

J. M. McGLYNN, Assistant Examiner

U.S. Cl. X.R.

24—126, 211; 339—254